H. L. WHITE.
RIFLING TOOL.
APPLICATION FILED MAY 15, 1918.
1,304,429.
Patented May 20, 1919.
2 SHEETS—SHEET 1.
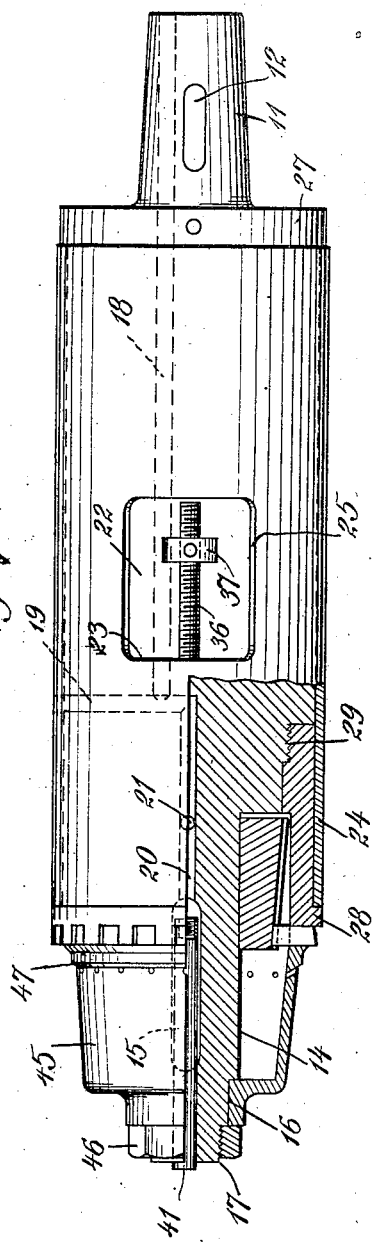
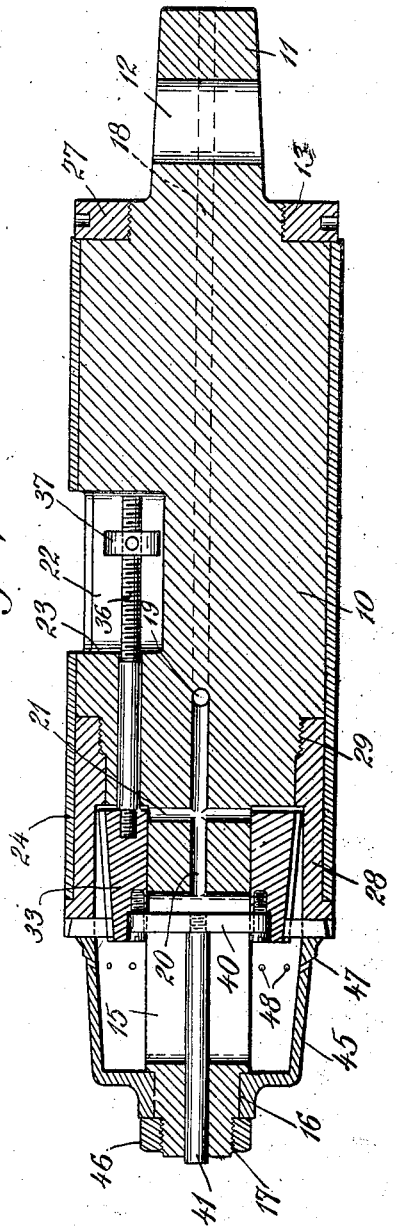
INVENTOR
Howard L. White
BY
Marshall E. Dearborn
ATTORNEY H. L. WHITE.
RIFLING TOOL.
APPLICATION FILED MAY 15, 1918.
1,304,429.
Patented May 20, 1919.
2 SHEETS—SHEET 2.
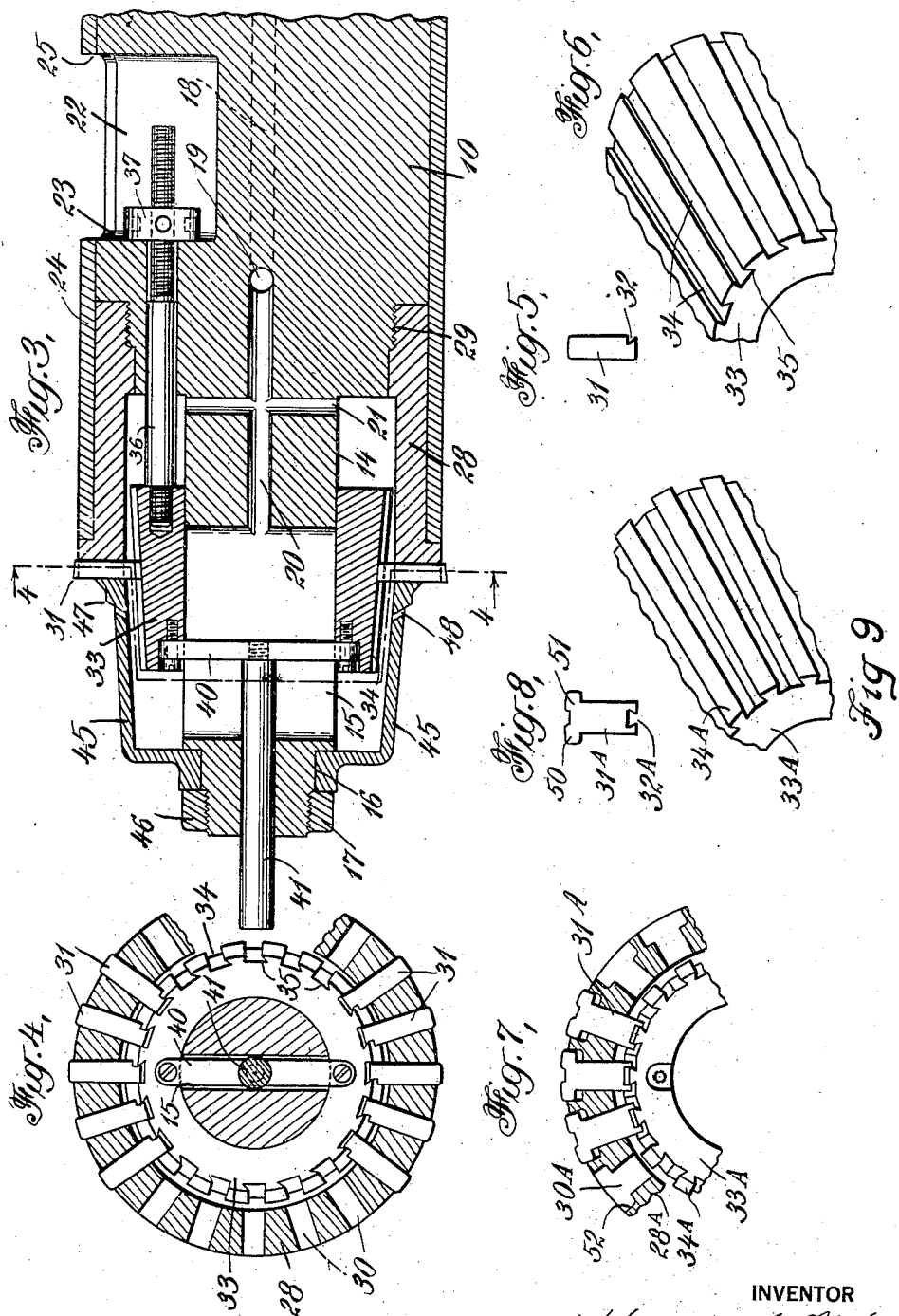
INVENTOR
Howard L. White
BY
Marshall & Dearborn
ATTORNEY

UNITED STATES PATENT OFFICE.

HOWARD L. WHITE, OF BROOKLYN, NEW YORK.

RIFLING-TOOL.

1,304,429. Specification of Letters Patent. Patented May 20, 1919.

Application filed May 15, 1918. Serial No. 234,590.

*To all whom it may concern:*

Be it known that I, HOWARD L. WHITE, a citizen of the United States of America, and a resident of Brooklyn, Kings county, and State of New York, have invented certain new and useful Improvements in Rifling-Tools, of which the following is a specification, reference being had to the accompanying drawings, forming a part thereof.

My invention relates to new and useful improvements in rifling tools, and its object is to provide a strong tool of simple construction for cutting the rifle grooves in guns, and to improve upon such tools as have been available heretofore.

In order that my invention may be thoroughly understood I will now proceed to describe the same in the following specification, and then point out the novel features thereof in appended claims.

Referring to the drawings:

Figure 1 is a plan view, partly in section, of a rifling tool made according to and embodying my invention.

Fig. 2 is a sectional elevation of the same tool.

Fig. 3 is a sectional elevation on a larger scale, of the forward part of the tool shown in the preceding figures.

Fig. 4 is a sectional front elevation of the tool, the section being taken on the line 4—4 of Fig. 3.

Fig. 5 is a front elevation of one of the cutters.

Fig. 6 is a perspective view of a portion of a slidable sleeve which forms a part of the apparatus.

Fig. 7 is a sectional front elevation of a portion of a tool of modified construction which also embodies this invention.

Fig. 8 is a front elevation of one of the cutters of the form shown in Fig. 7.

Fig. 9 is a perspective view corresponding with Fig. 6, illustrating the construction of the slidable sleeve of the modification shown in Fig. 7.

Like characters of reference designate corresponding parts in all the figures.

10 designates a substantially cylindrical tool head, the rear end of which forms a shank 11 tapered to fit the socket of the boring bar of a rifling machine with a transverse slot 12 through it. 13 is a threaded part between the shank and the body of the head. At the other end of this head is a cylindrical portion 14, through which is cut a transverse slot 15, a hub 16 of smaller diameter and a threaded end 17. 18 is a longitudinal oil duct offset from the slot 12 and communicating with a transverse duct 19 which is connected with a central duct 20 running to the slot 15. 21 is another transverse oil duct which passes through the duct 20. The head is cut away as shown at 22 to form a chamber or pocket, the forward wall of which is designated by 23.

Over the main body of the tool head is a jacket 24 which is cut away at 25 over the chamber 22. This jacket is retained between a nut 27 screwed onto the threaded part 13, and a cutter holder 28.

The forward end of the cutter holder is provided with a plurality of radially disposed grooves 30 for guiding the cutters 31. These are rectangular in cross-section and each is provided near its inner end with a notch 32. Slidably mounted on the cylindrical part 14 is a truncated conical sleeve 33 with a cylindrical bore. In its outer surface are longitudinally disposed grooves 34, one edge of each of which is undercut as at 35 (Figs. 4 and 6) to engage the notches 32 of the cutters. An adjusting stud 36 is affixed to the rear end of the sleeve and extends through a suitable hole in the head into the pocket 22. Its rear end is threaded to receive an adjusting nut 37. Affixed to the forward end of the sleeve is a straddle bar 40 which passes through the slot 15. An actuating rod 41 is affixed to the straddle bar and extends forwardly therefrom through the hub 16 and threaded end 17 of the head.

45 is a housing provided with a bore which the hub 16 fits. A nut 46 serves to hold this housing in place with its rear surface over the grooves 30 in the cutter holder 28. Ahead of the cutters the outer surface of the housing forms a shoulder 47 just ahead of which are oil holes 48. This shoulder is provided for the purpose of preventing chips from entering the oil holes.

I will now describe the operation of this tool. The head is placed on the end of the boring bar of a rifling machine and the operator by adjusting the nut 37 and forcing the sleeve 33 by a bar inserted in the pocket 22 back of the stud 36 causes the cutters to project a distance beyond the jacket 24 corresponding with the desired depth of cuts. The cutters are shown in cutting position in Fig. 3. The diameter of the jacket is such that it closely fits the bore of the gun to be rifled. Now the whole tool is driven through the gun. Near the end of the stroke of the boring bar the actuating rod 41 strikes an abutment and forces the sleeve 33 back. This retracts the cutters into the position in which they appear in Figs. 1 and 2 by the time the boring bar reaches the end of its forward stroke. Thus during the backward stroke of the boring bar the cutters are in out of the way.

At the end of the backward stroke the operator backs off the nut 37 a quarter turn or other desired amount, and again forces the collar forward until the nut strikes the forward wall 23 of the pocket in which it is located. The cutters will now project outwardly a little farther than they did before or into position to make the next cut. This operation is repeated until the rifle grooves have the desired depth.

It is to be noted that oil which is supplied through the boring bar in the usual manner will be led through the ducts and oil holes which have been pointed out, directly to the desired parts of the tool.

With the tool a large number of rifle grooves may be cut simultaneously. If a still greater number of grooves is desired, the cutters may be made each with more than one cutting surface. For example, in Figs. 7 and 8, the cutters 31$^A$ have two cutting ends 50 and 51. The bodies of these cutters are somewhat wider than those of the cutters previously described, consequently the cutter holder 28$^A$ is made with wider radial grooves 30$^A$ and their outer ends made still wider as at 52 to receive the widened end of the cutters. In this modification the cutters are provided at their inner ends with undercut grooves 32$^A$, which fit slidably over dovetail ribs 34$^A$ on the sleeve 33$^A$.

By this simple arrangement rifle grooves may be cut with the greatest nicety and the entire operation of rifling a gun accomplished much more rapidly than is possible with the devices now in use. Moreover, injury to a cutter is not a serious matter for a broken cutter may be replaced by a new one without disturbing the others.

Structures of preferred form and construction have been illustrated and described for the purpose of showing ways in which this invention may be used, but the inventive thought upon which this application is based is broader than these illustrative embodiments thereof, and I therefore intend no limitations other than those imposed by the appended claims.

What I claim is:

1. A rifling tool comprising a head having a forward central cylindrical portion of reduced diameter, a hollow sleeve longitudinally slidable on said portion, radial guides surrounding the sleeve, cutters in said guides, and slidable connections between each cutter and the sleeve, the parts of said sleeve with which the cutters are connected being inclined to the direction of movement of the sleeve.

2. A rifling tool comprising a head having a forward central cylindrical portion of reduced diameter, a hollow sleeve longitudinally slidable on said portion, radial guides surrounding the sleeve, cutters in said guides, and slidable connections between each cutter and the sleeve, the parts of said sleeve with which the cutters are connected being inclined to the direction of movement of the sleeve, said cylindrical portion being constructed with a transverse slot and provided with an axial bore, a bar affixed to the sleeve and passing through said slot, and a rod affixed to said bar and protruding through said bore.

3. A rifling tool comprising a head having a forward central cylindrical portion of reduced diameter, a hollow sleeve longitudinally slidable on said portion, radial slots surrounding the sleeve, cutters in said slots, slidable connections between each cutter and the sleeve, the parts of said sleeve with which the cutters are connected being inclined to the direction of movement of the sleeve, and a housing supported on said forward portion of the head arranged to close said cutter slots and to inclose said slidable sleeve.

4. A rifling tool comprising a head, radial guides therein, a hollow sleeve longitudinally slidable in relation to said head, an internal support for the sleeve, cutters in said guides, slidable connections between each cutter and the sleeve, the parts of said sleeve with which the cutters are connected being inclined to the direction of movement of the sleeve, manual means for longitudinally moving the sleeve in one direction to move the cutters outwardly, and means for automatically moving the sleeve in the opposite direction to move the cutters inwardly at the end of their cutting movement.

5. A rifling tool comprising a head, radial guides therein, a sleeve longitudinally slidable in relation to said head, cutters in said guides, slidable connections between each cutter and the sleeve, the parts of said sleeve with which the cutters are connected being inclined to the direction of movement of the sleeve, a threaded stud whereby said sleeve may be manually moved in one direction to move the cutters outwardly, a nut on said stud arranged to limit said movement of the sleeve, an actuating rod connected with the sleeve and projecting beyond the end of said head, whereby the sleeve may be moved in the opposite direction to retract the cutters.

6. A rifling tool comprising a head, radial guides therein, a sleeve longitudinally slidable in relation to said head, cutters in said guides, slidable connections between each cutter and the sleeve, the parts of said sleeve with which the cutters are connected being inclined to the direction of movement of the sleeve, a threaded stud whereby said sleeve may be manually moved in one direction to move the cutters outwardly, a nut on said stud arranged to limit said movement of the sleeve, an actuating rod connected with the sleeve and projecting through the front end of the head and having a bearing therein.

7. A rifling tool comprising a head, radial guides therein, a hollow sleeve longitudinally slidable in relation to said head, an internal support for the sleeve, cutters in said guides, slidable connections between each cutter and the sleeve, the parts of said sleeve with which the cutters are connected being inclined to the direction of movement of the sleeve, manual means for longitudinally moving the sleeve in one direction to move the cutters outwardly, and means for automatically moving the sleeve in the opposite direction to move the cutters inwardly at the end of their cutting movement, said head being constructed to form oil ducts, and a housing arranged to close the guides and hold the cutters therein, and provided with oil holes in front of the cutters.

8. A rifling tool comprising a head, radial guides therein, a sleeve longitudinally slidable in relation to said head, cutters in said guides, slidable connections between each cutter and the sleeve, the parts of said sleeve with which the cutters are connected being inclined to the direction of movement of the sleeve, manual means for longitudinally moving the sleeve in one direction to move the cutters outwardly, means for automatically moving the sleeve in the opposite direction, to move the cutters inwardly at the end of their cutting movement, said head being constructed to form oil ducts, a housing arranged to close the guides and hold the cutters therein and provided with oil holes in front of the cutters, and an annular shoulder between the oil holes and the cutters.

In witness whereof, I have hereunto set my hand this 14 day of May, 1918.

HOWARD L. WHITE.